Aug. 4, 1936. J. L. ANDERSON 2,050,147
TRACK FOR TORCH CARRIAGES
Filed Oct. 31, 1935   3 Sheets-Sheet 1
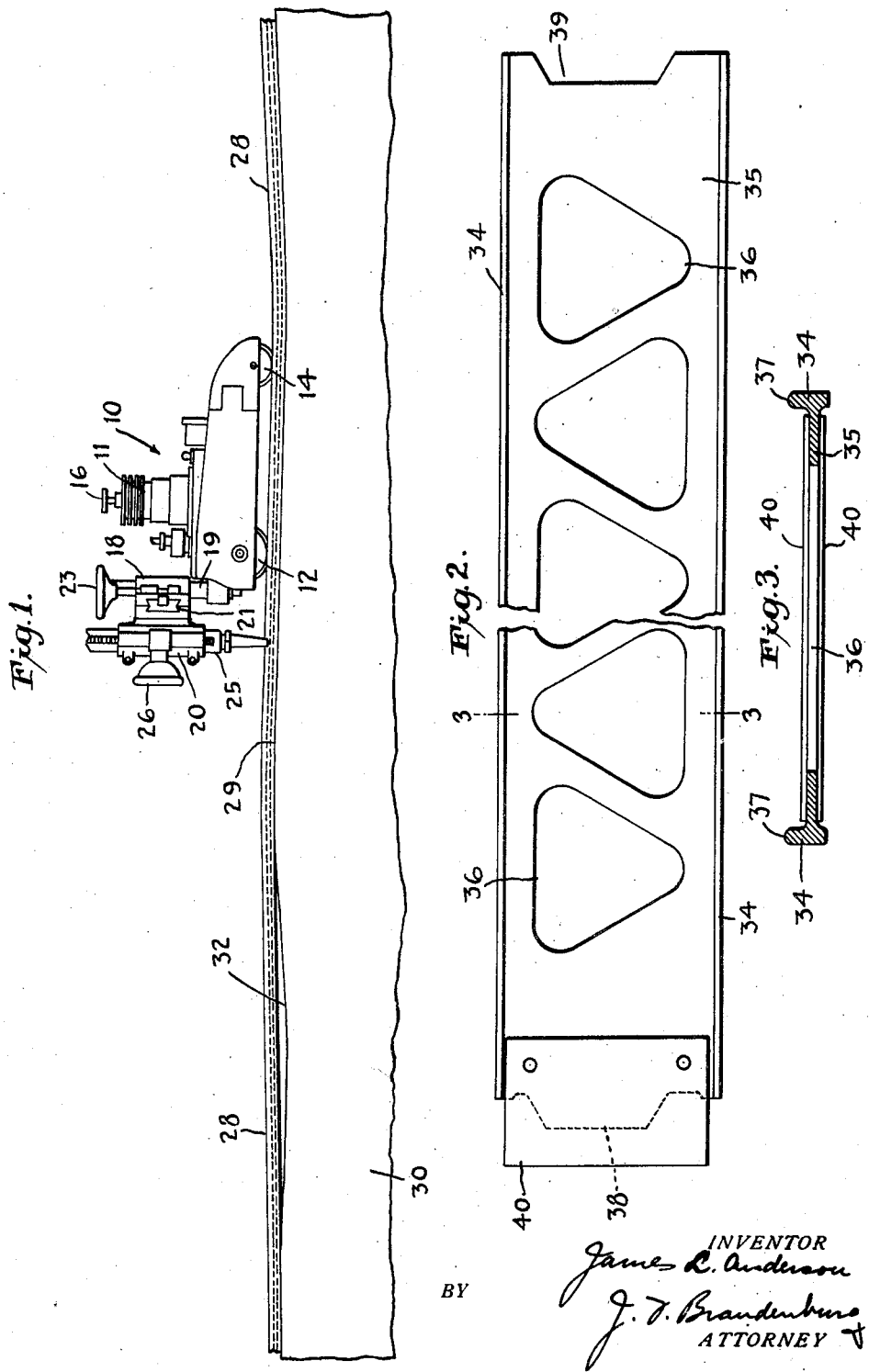
INVENTOR
James L. Anderson
BY
J. T. Brandenburg
ATTORNEY Aug. 4, 1936.    J. L. ANDERSON    2,050,147
TRACK FOR TORCH CARRIAGES
Filed Oct. 31, 1935    3 Sheets-Sheet 2
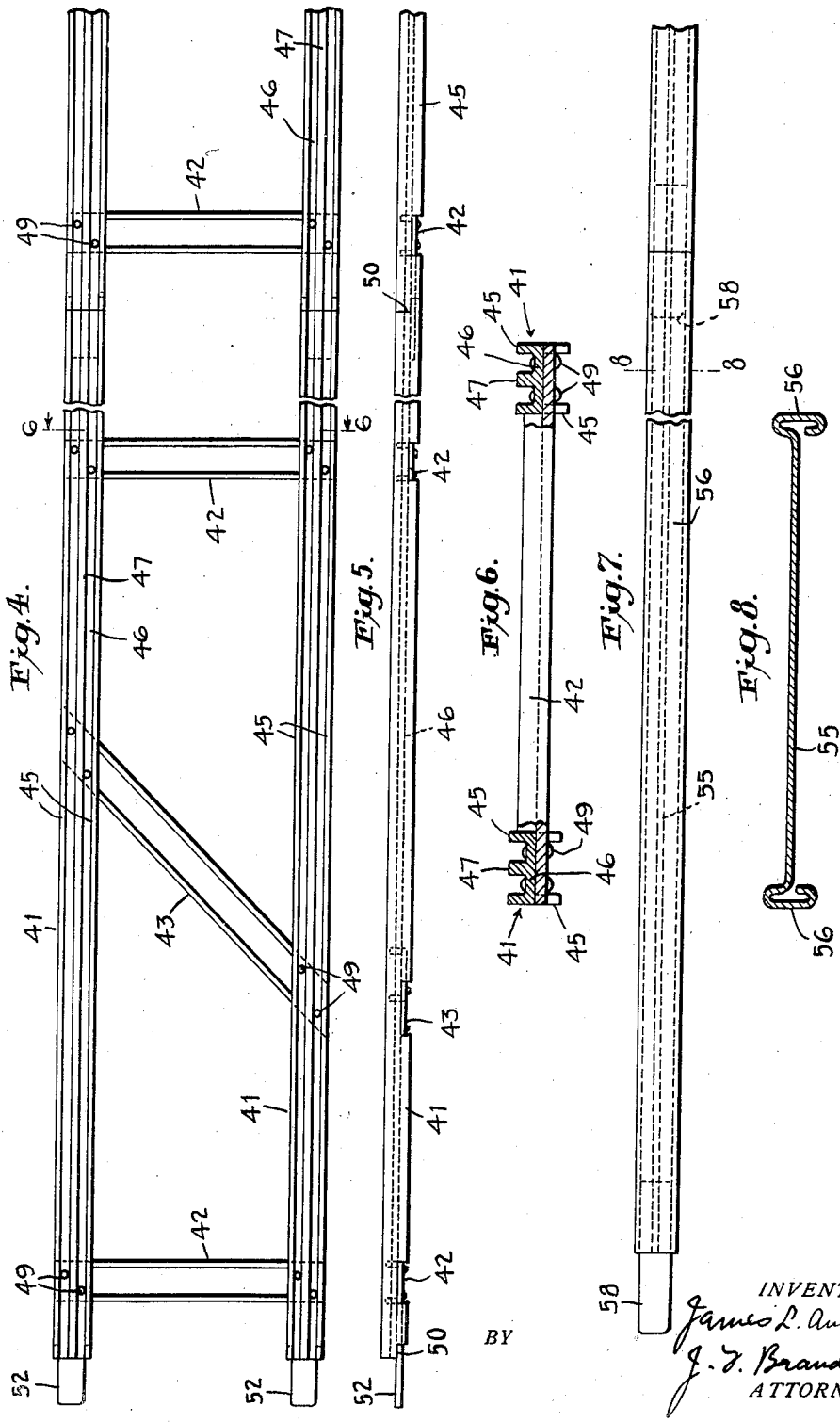
INVENTOR
James L. Anderson
J. J. Brandenburg
ATTORNEY Aug. 4, 1936.   J. L. ANDERSON   2,050,147
TRACK FOR TORCH CARRIAGES
Filed Oct. 31, 1935    3 Sheets-Sheet 3
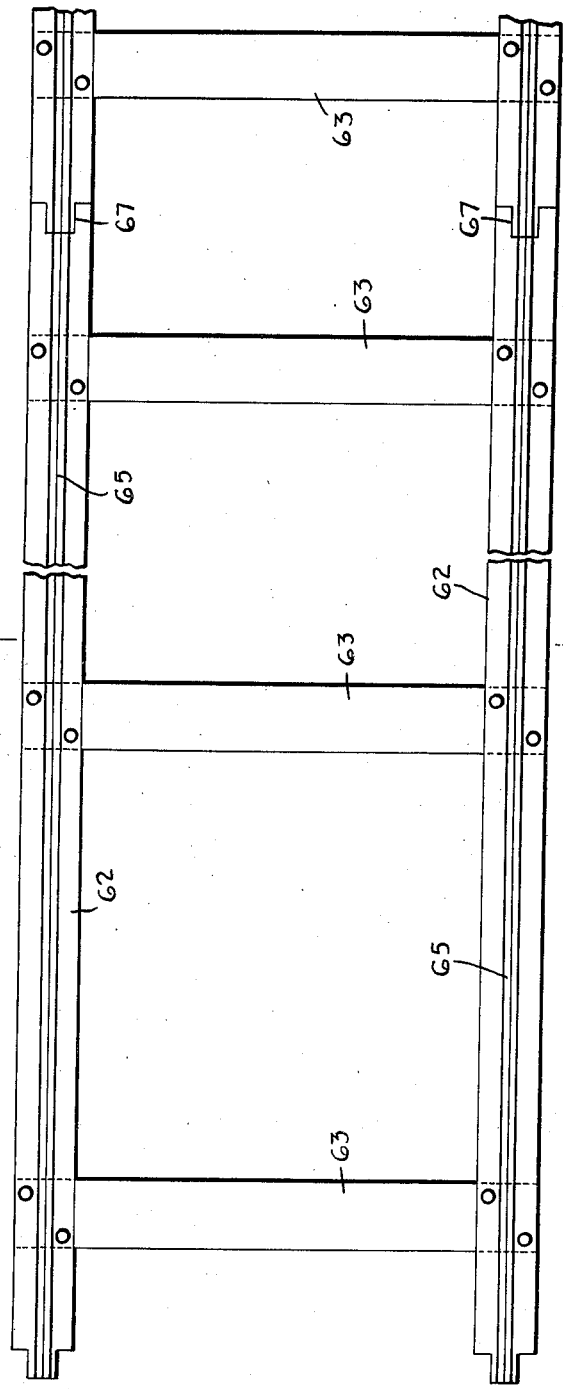
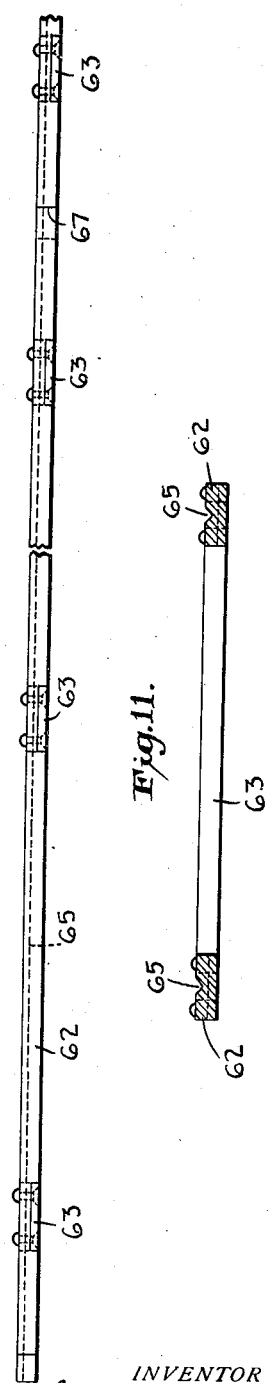
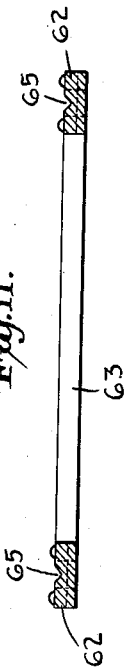
INVENTOR
James L. Anderson
J. F. Brandenburg
ATTORNEY Patented Aug. 4, 1936

2,050,147

UNITED STATES PATENT OFFICE 2,050,147

TRACK FOR TORCH CARRIAGES

James L. Anderson, Closter, N. J., assignor to Air Reduction Company, Incorporated, New York, N. Y., a corporation of New York Application October 31, 1935, Serial No. 47,591

13 Claims. (Cl. 266—23)

A self-propelled carriage stably supported on a track or other surface is one of the most efficient and economical devices for moving a cutting or welding torch with uniform speed along a path of substantial length. Such carriages have three or four wheels arranged to give them transverse as well as lateral stability and ordinarily adapted to run on a track which holds the carriage to the desired course. This invention relates to improvements in tracks for such carriages.

The tracks must be strong enough so that they will not become damaged when moved around the shop from one job to another and subjected to careless handling. Damage affecting a rail surface or the gauge or contour of a track may affect the operation of the carriage sufficiently to make the work done by the torch unsatisfactory. The rejection of a large piece of work is a substantial loss, and even if the inaccuracy can be corrected, the labor of correcting makes an objectionable increase in the cost of the work. Prevailing practice is to make track sections of strong, rigid, beam construction, and to fasten sections securely together when it is necessary to have a track longer than one section.

It is an object of this invention to provide an improved track which has the necessary strength to withstand shop handling without damage, but which has a resilient flexibility in a plane normal to the surface of the work over which the torch is moved. An advantage of this track construction is that when supported directly by a warped or undulatory surface of a plate or other work, the track flexes under the weight of the carriage and maintains the torch tip at a substantially constant distance from the surface of the work.

Variation in the spacing of the torch tip from the work, such as occurs when a rigid track rests on the work and bridges depressions, causes the width and character of the cut to vary, and results in irregularity of the edge cut and some change in the dimensions of the piece. The cutting action of the torch may stop completely if the separation of the tip from the work becomes very large.

While providing flexibility in a plane normal to the surface of the work, this invention does not impair the strength of the rails or the ability of the track to withstand deformations which would change its gauge or its straightness or arc of curvature. In the preferred embodiments of the invention the track has no transverse flexibility and its resilience returns it to its original form after it is flexed in a vertical plane by the weight of the carriage.

One feature of the invention relates to a special type of track in which the rails for the wheels are protected from damage by guard rails which prevent the wheel rails from striking against obstructions when sections of track are being shifted from place to place between jobs.

Another object of the invention is to provide a jointed track which is rigid in a transverse plane but flexible in a vertical plane so that the track accommodates itself to the broad contours of the face of the work on which the track is laid.

Other objects, features and advantages of the invention will appear or be pointed out as the specification proceeds.

In the accompanying drawings, forming part hereof:

Fig. 1 is a side elevation showing a self-propelled torch carriage running on a track which embodies the invention and is shown supported on an undulative slab;

Fig. 2 is an enlarged top plan view of a section of the track shown in Fig. 1;

Fig. 3 is an enlarged sectional view taken on the line 3—3 of Fig. 2;

Fig. 4 is a top plan view of a modified form of track embodying the invention;

Fig. 5 is a side elevation of the track shown in Fig. 4;

Fig. 6 is an enlarged sectional view taken on the line 6—6 of Fig. 4;

Figs. 7 and 8 are a side elevation and a sectional view, respectively, illustrating another modified form of the invention;

Fig. 9 is a top plan view of another modified form of the invention;

Fig. 10 is a side elevation of the track shown in Fig. 9; and

Fig. 11 is a sectional view on the line 11—11 of Fig. 9.

A four-wheeled self-propelled torch carriage 10 has a motor 11 and driving mechanism connecting the motor with the front wheels 12. No power is applied to the rear wheels 14, and most of the weight of the carriage and its torch supporting structure is sustained by the driving wheels to increase their tractive effort. The speed of the motor 11 is controlled by a governor 16.

A bracket 18 clamped to a post 19 on the front of the carriage 10 supports a torch-holder 20. The torch-holder is connected to the bracket by a dove-tail bearing 21 which permits the torch-holder to slide on the bracket to effect transverse adjustment of the torch. A hand-wheel 23 controls the sliding movement of the torch-holder 20 on the bracket 18.

An oxygen cutting torch 25 is supported by the torch-holder 20. The torch can be adjusted vertically in the holder by a hand-wheel 26.

The carriage runs along a track 28, which may be in two or more sections connected at a joint 29. The track is shown supported on an undulative slab 30. When its points of support are far apart, the track sags to some extent under its own weight, but it bridges the major depressions in the slab, such as the depression 32, until the weight of the carriage 10 comes on the unsupported portion of the track and flexes it down into contact with the surface of the slab.

The track under the carriage in Fig. 1 is shown flexed, by the weight of the carriage, into contact with a depressed portion of the slab 30. The undulations in the slab are exaggerated in the drawing for clearer illustration.

The construction of the track is shown in Figs. 2 and 3. Low flanges 34 are connected by a web 35. Large openings 36 are cut in the web to reduce its weight and stiffness. The flanges 34 extend for a very short distance below the web 35; just enough to insure that the track will be supported by the flanges instead of by some single point on the web between the flanges. The top edges 37 of the flanges are finished to provide smooth rails for the carriage wheels and the flanges extend above the web 35 considerably further than they extend below in order to prevent the flanges on the carriage wheels from striking the web or the fillet between the flange and web.

The total height of the flanges must be limited in order to give the track the desired flexibility normal to the web. It is not advantageous to make the flanges flexible by reducing their thickness because that impairs their strength and makes them liable to damage from objects dropping on the rails or from striking the track sections against obstructions when moving them around the shop. The web 35 is thin enough to bend for vertical flexing of the track, but the strength of the web is sufficient to make the track sections transversely rigid.

Track sections having flanges twice as wide as the thickness of the web, and in which the flanges extend below the web for a distance equal to the web thickness and above the web by twice that amount, have proved very satisfactory in service with a web thickness of approximately one-eighth of an inch.

Each track section has a tongue 38 at one end and a recess 39 at the other. Parallel plates 40 riveted to the upper and lower faces of the web at the tongue end of each track section extend beyond the end of the tongue and receive the web of the next section between them when two track sections are brought together. The plates 40 cooperate with the flanges to hold the track sections in a straight line.

Figs. 4–6 show a modified form of track in which side frames 41 are rigidly connected to cross-ties 42. The horizontal rigidity of the track structure is increased by disposing some of the ties diagonally. One diagonal tie 43 is shown in Fig. 4.

Each of the side frames 41 has parallel flanges 45 connected by a web 46. A rail 47 extends upward from the web 46, but preferably no higher than the flanges 45 which serve as guards to protect the rail. Any injury to the rails is likely to interfere with the uniform movement of the carriage and cause irregularities in the cut made by the torch.

The cross-ties 42, 43 are channel sections with their flanges cut away at both ends of the ties and the projecting webs extending through recesses in the flanges 45 of the side frames. The projecting ends of the ties are fastened to the webs 46 of the side frames by rivets 49.

At the ends of the track sections the flanges 45 have steps 50 which fit together as shown in Fig. 5. A tongue 52 connected to the left end of each side frame 41 extends between the flanges 45 of the next section to maintain the adjacent sections in a straight line.

Figs. 7 and 8 show a flexible track having a sheet-metal web 55 between flanges 56. These flanges constitute the rails of the track. For a portion of their length, the sheet metal of the flanges 56 is wrapped around strips 58 which project beyond the ends of the sheet metal to form prongs at the left end of each track section. The strips 58 can extend for various distances inside the flanges 56, depending on the desired stiffness of the track, but in all cases the strips 58 must terminate short of the right end of the track section to leave a recess long enough to receive the prongs formed by the strips projecting from the next section of track.

Figs. 9–11 illustrate a track for wheels which have no flanges. All of the other tracks shown in the drawings are for flanged wheels. In Figs. 9–11 parallel supporting strips 62 are connected by cross-ties 63. Each of the strips 62 is of rectangular cross-section with its long dimension transverse of the track to obtain vertical flexibility and horizontal rigidity. Each strip 62 has a groove 65 in its upper surface, and the carriage wheels run in these grooves.

The ends of the ties 63 are of reduced height and fit into recesses in the bottom faces of the strips 62. The ties are fastened to the strips 62 by rivets. Opposite ends of the track sections are of tongue and groove construction so that sections of track can be fitted together with a joint 67 in which each track section holds the other against lateral displacement.

The preferred embodiment and certain modifications of the invention have been described, but other modifications can be made without departing from the invention as defined in the claims.

I claim:

1. Oxygen cutting or welding apparatus including a self-propelled, wheeled carriage for moving a torch across the work, and a track for the carriage adapted to rest on the surface of the work, said track comprising low parallel flanges joined by a horizontal web which gives the track transverse rigidity, the upper edges of said flanges serving as rails for the carriage wheels, and the height of said flanges and thickness of the web being so limited that the weight of the carriage causes the track to bend downward and follow undulations in the surface of the work.

2. A track for guiding a torch carriage, including rails which are flexible in a vertical direction, and means holding the rails in correct spaced relation and bracing them against flexing in a horizontal direction.

3. A flexible track comprising an I-beam having a web connecting low flanges which constitute the rails of the track, said web having portions cut out between the flanges to decrease the weight and stiffness of the web, and said flanges being limited in height to leave the track flexible in a direction normal to the plane of the web.

4. A track for supporting and guiding a torch carriage, said track comprising an I-beam constructed and arranged to flex normal to the plane of the web and having a relatively thin web, and low flanges of substantially greater horizontal width than the thickness of the web and adapted to serve as rails for the torch carriage.

5. A flexible track such as described in claim 4 with the horizontal thickness of the flanges approximately twice that of the web.

6. A flexible track comprising parallel resilient rails connected by an integral web which is flexible in a vertical direction but rigid transversely of the track, said web joining the rails near their bottom edges so that grooved wheels running on the upper face of the rails are well above the connection of the web with said rails.

7. A track for a self-propelled torch carriage including parallel rails, each of which includes a wheel rail and a guard rail laterally spaced from but extending along the wheel rail, the height of said guard rail being at least as great as that of the wheel rail so that the guard rail serves to protect the wheel rail from injury in the event that objects fall across the track or the track is struck against an obstruction when being moved from place to place.

8. A track for a self-propelled torch carriage including flexible parallel rails, each of which includes a wheel rail and a guard rail laterally spaced from but extending along the wheel rail, the height of said guard rail being at least as great as that of the wheel rail so that the guard rail serves to protect the wheel rail from injury in the event that objects fall across the track or the track is struck against an obstruction when being moved from place to place, and ties connected with the rails to brace them against horizontal flexible movement while leaving them free to flex in a vertical direction to follow undulations of the surface on which the track is supported.

9. A section of track for a self-propelled torch carriage comprising a beam-like structure having a horizontal web with a thickness of approximately one-eighth of an inch and with numerous openings through the web to reduce its weight and give it flexibility in a vertical direction while leaving it rigid against horizontal strains, and parallel flanges integral with the web and extending below the level of the bottom face of the web for a distance substantially equal to the thickness of the web and above the level of the top face of the flange for a distance substantially twice as great as the web thickness, the junctures of the flanges with the top face of the web being free of long radius fillets so that the flanges serve as rails for grooved or inside-flanged wheels of a self-propelled torch carriage.

10. A section of flexible track for a self-propelled torch carriage including two parallel rails flexible in a vertical direction but transversely rigid, and ties connecting the rails, some of said ties extending between the rails at different angles from other ties to brace the rails at a constant gauge.

11. A flexible sheet-metal track comprising a web portion with each of its edges bent upward above the level of the web and then back on itself to a level below that of the web to form a low vertically flexible flange, said flanges comprising the rails of the track.

12. A flexible sheet-metal track comprising a web portion with each of its edges bent upward above the level of the web and then back on itself to a level below that of the web to form a low vertically flexible flange, said flanges comprising the rails of the track and a strip around which each of the sheet-metal edges extends, the strips in the flanges extending beyond the sheet metal at one end of the track to form prongs for connecting with another section of track, said strips terminating short of the other end of the track to leave recesses for receiving the prongs of another section of track.

13. A flexible track for supporting and guiding a torch carriage over the work, including two parallel rails which are flexible in a vertical direction so that they bend in accordance with undulations of the surface on which they are supported, said rails being transversely rigid and connected to cross-ties which hold the rails parallel and at a fixed distance from one another.

JAMES L. ANDERSON.